United States Patent Office 3,038,609
Patented June 12, 1962

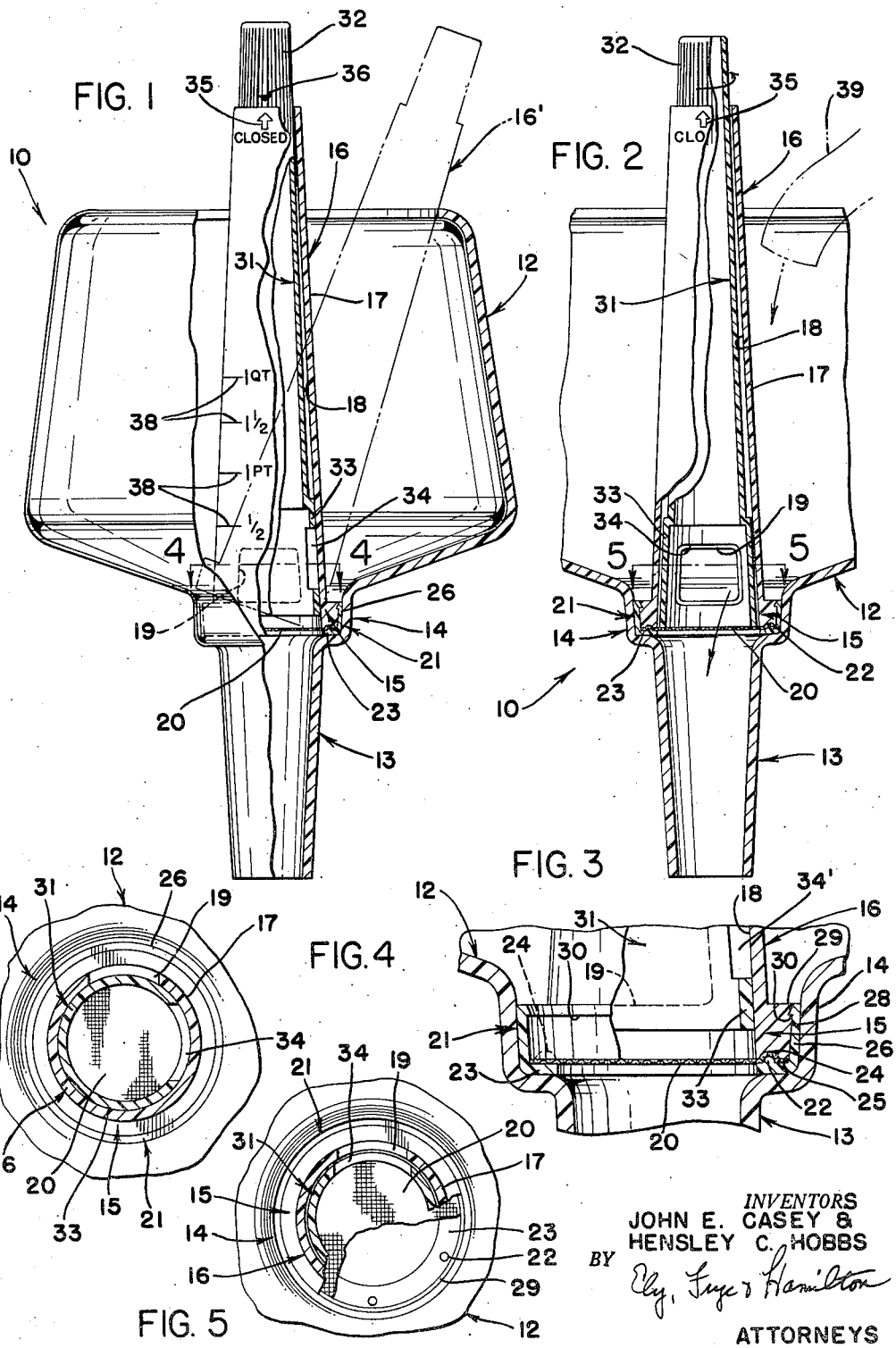

3,038,609
COMBINED FUNNEL AND MEASURING DEVICE
John E. Casey and Hensley C. Hobbs, Wooster, Ohio, assignors to Rubbermaid Incorporated, Wooster, Ohio, a corporation of Ohio
Filed Dec. 5, 1960, Ser. No. 73,715
6 Claims. (Cl. 210—86)

The present invention relates generally to a filter-funnel. More particularly, the present invention relates to a funnel adapted to be used selectively to measure and selectively to filter liquids.

Two-cycle gasoline engines are extremely prevalent. Each sportsman or homeowner generally has at least one implement powered by a two-cycle engine. For example, outboard engines and lawn mower engines are practically universally of the two-cycle variety because of their light weight and relatively economical cost to manufacture. However, there is one inconvenience attendant upon this form of power supply. That is, an engine lubricant must be mixed with the gasoline in proper proportions. A typical proportion requires that one quart of motor oil be mixed with four gallons of gasoline.

The requirement for measured proportions has caused most users to maintain a supply can of the fuel mixture with which to fill the limited capacity fuel tank on the engine. Maintaining a stock supply adds further complications. The supply can must practically be emptied in order to know how much of each component of the fuel mixture to pour into the can for refilling. If the mixture is unused for a period of several months the gasoline deteriorates. The deterioration of the gasoline causes sedimentation, which can clog the carburetion system, and causes the mixture to burn overly hot and unevenly—i.e., improper firing. Experience has shown that fuel burning in this manner will severely pit the piston head and walls, eventually destroying the engine's efficiency. Furthermore, it is a well known fact that if a can or tank is kept less than full for any period of time the daily changes in temperature and humidity will cause condensation within the can which adds unwanted water to the fuel mixture. This condensation also causes the interior surface of the can to rust, making sediment which contaminates the fuel.

It is therefore an object of the present invention to provide a filter funnel which can measure exact quantities.

It is another object of the present invention to provide a measuring funnel which can selectively be used to filter water and sediment from gasoline and also selectively permit the flow of more viscous liquid, such as lubricating oil therethrough.

It is a further object of the present invention to provide a measuring filter funnel which is durable, rust-proof, shatter-proof, light weight and inexpensive to manufacture.

It is a still further object of the present invention to provide a measuring filter funnel which floats.

These and other objects apparent from the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Referring to the drawings:
FIG. 1 is an elevation partly cut away and partly in section showing a measuring filter funnel according to the present invention;

FIG. 2 is a fragmentary elevation similar to FIG. 1 partly broken away and partly in section showing the flow path through the filter medium;

FIG. 3 is an enlarged fragmentary area of FIG. 1 more completely in section;

FIG. 4 is a sectional view taken substantially on line 4—4 of FIG. 1; and

FIG. 5 is a sectional view taken substantially on line 5—5 of FIG. 2.

A measuring filter funnel according to the present invention generally comprises a body portion having an upper reservoir portion and a lower tube portion. A graduated hollow plug member removably seats in a socket formed at the juncture between the funnel tube and the funnel reservoir to form a seal therebetween. A filter is positioned across the base of the plug and a stopper tube is rotatably received therein. The stopper tube can be selectively rotated to permit flow from the reservoir into the plug, out through the filter and into the tube portion of the funnel. Alternatively, direct flow from the reservoir into the tube can also be effected by unseating the plug. This, of course, bypasses the filter.

Referring now to the drawings, the measuring filter funnel, designated generally by the numeral 10, is preferably made of some light-weight, durable material which floats, such as polyethylene and other suitable plastic materials. Funnel 10 has a main body which comprises an upper or reservoir portion 12 and a lower or tube portion 13. The juncture of the reservoir and tube portions 12 and 13 forms a socket 14 into which removably but sealingly seats the base 15 of hollow plug member 16 having an axial passage. Plug 16 also has a sleeve 17 which extends upwardly from base 15 terminating in an upper end higher than the top of reservoir 12. The entire plug 16 is bored to provide a tapered or conical inner surface 18. Immediately above base 15 a slotted aperture 19 is provided through sleeve 17 for a purpose more fully hereinafter described.

A filter 20, which is preferably a bronze screen of sufficiently fine mesh to remove water from gasoline filtered therethrough, is secured across the open end of base 15 preferably by a retainer thimble 21. A series of hemi-spherical protuberances 22 extend inwardly from the flange 23 forming the base of thimble 21. A matching series of concavities 24 in the lowermost surface 25 of base 15 receive protuberances 22 to engage filter 20 therebetween.

The side wall 26 of thimble 21 frictionally engages the circumferential side wall 28 of base 15 to retain the thimble 21 thereon and maintain filter 20 in position across the mouth of the hollow plug member 16. An annular catch dog 29 may be provided on the interior of side wall 26 of thimble 21 to engage a corresponding annular notch 30 in side wall 28 of base 15, to assure retention of the thimble 21 and filter 20. In any event the thickness of thimble side wall 26 is such as to frictionally seal the outer diameter of base 15 against the inner diameter of socket 14.

A hollow stopper 31 is received within and extends above the tapered bore through plug member 16. The upper end 32 of stopper 31 is knurled or ribbed to provide a finger gripping surface and tapered at such a degree as to permit selective engagement of the ribs with the inner surface 18 of the plug 16 upon axially upward displacement of the stopper 31. The lower portion 33 of stopper 31 is offset outwardly of the remainder of stopper 31 and has an outer surface which tapers in conformity with the inner surface 18 of the plug 16 so that an axial displacement of stopper 31 sufficient to engage the ribs against the upper end of sleeve 18 also frictionally engages the lower portion 33 of stopper 31 with the interior of the plug 16. Near the base of lower portion 33 there is a slotted aperture 34 comparable to aperture 19 in plug 16 and which is selectively registrable therewith. A reference triangle 36 on stopper 31 indicates the relative position of apertures 34 and 19 by reference to an arrow 35 on the plug marked "closed" and a similar arrow at 90° (not shown) marked "open."

The funnel 10 would be used substantially as follows. The amount of lubricant required for the volume of fuel to be mixed is computed. The plug 16 is sealingly seated in socket 14 and the arrow and reference marks 35 and 36, respectively, are aligned to show that the apertures 34 and 19 are not communicating. The stopper 31 is then axially displaced upwardly to seal the aperture 19 in plug 16 closed. In this configuration the funnel 10 can be used to measure and the lubricant is poured into the reservoir portion 12 with the funnel upright until the level of the lubricant raises to the appropriate graduation 38 on sleeve 17, indicating the computed amount. The operator, therefore, is no longer required to buy measured quantities of oil but can now buy it in bulk quantities. The plug 16 is then unseated, as shown in phantom and designated 16' in FIG. 1, and the lubricant permitted to drain through tube 13 into the fuel tank or receiving receptacle. Plug 16 is then reseated in socket 14.

If a premeasured amount of gasoline is available the stopper 31 is axially lowered, releasing its frictional engagement with plug 16, and rotated to register apertures 34 and 19. The premeasured amount of gasoline is poured into the reservoir 12, as by spout 39 shown in phantom in FIG. 2. From the reservoir 12 the gasoline passes through apertures 34 and 19 into the interior of plug 16 and stopper 31 and out through filter 20 which removes any water or sediment in the gasoline.

If only a bulk quantity of gasoline is available it is obvious that successive increments totalling the amount desired may be measured in reservoir 12 and released through filter 20 by manipulation of stopper 31 alternately to open and seal aperture 34 while the plug 16 remains seated in socket 15.

A device according to the present invention provides a means for measuring and funneling oils and other viscous liquids and also for measuring, funneling and filtering water and sediment from less viscous fluids, such as gasoline.

What is claimed is:

1. A funnel comprising a reservoir and a tube portion, a removable tubular plug fitting said tube portion for selectively retaining fluid in said reservoir, means for determining the volume of fluid in said reservoir, an opening in the lower portion of the wall of said plug connecting said tube portion with said reservoir, tubular valve means in said plug to open and close said opening, and a filter means secured to said removable plug between said tube portion and said opening.

2. A fluid funnel comprising a reservoir portion and a tube portion having a socket therebetween, a tubular plug, means for determining the volume of fluid in said reservoir, said plug adapted to be removably and sealingly received in said socket portion, an axial passage through said plug portion communicating with said tube portion, an aperture through the wall of the lower portion of said plug to permit drainage of fluid in said reservoir into said passage, tubular valve means in said plug to open and close said aperture and extending upwardly through said reservoir, and a filter means secured to said plug between said tube portion and said passage.

3. A fluid funnel comprising, a reservoir and a tube portion having a socket therebetween, a tubular plug, means for determining the volume of fluid in said reservoir, one end of said plug adapted to be removably and sealingly received in said socket, a tapered bore extending axially through said plug, an aperture through the side of said plug to permit draining the fluid in said reservoir into said axial bore, a tapered stopper rotatably received in said plug, said stopper adapted by rotation selectively to open and close said aperture, and filter means secured to siad plug between said tube portion and said axial bore.

4. A fluid funnel comprising, a reservoir and a tube portion having a socket therebetween, a plug, means for determining the volume of liquid in said reservoir, one end of said plug adapted to be removably and sealingly received in said socket, a bore extending axially through said plug, an aperture in the side of said plug to permit draining the fluid in said reservoir into said axial bore, a stopper rotatably received in said bore and extending upwardly through said reservoir for operation from the top thereof, a passage in said stopper communicating with said tube portion, an aperture in said stopper, a predetermined rotation of said stopper selectively closing the plug aperture or opening the plug aperture by juxtapositioning said stopper aperture to said plug aperture, and filter means secured to said plug between said tube portion and said axial bore.

5. A fluid funnel comprising a reservoir and a tube portion having a socket therebetween, a plug, means to determine the volume of fluid in said reservoir, a bore extending axially through said plug, filter means across one end of said bore, a retaining thimble having means cooperating with said plug to secure said filter means to said plug, the end of said plug on which said thimble and filter are mounted being adapted to be removably and sealingly received in said socket, an aperture in the side of said plug connecting said reservoir to said bore, and tubular valve means in said plug selectively to open and close said aperture.

6. A fluid funnel comprising a reservoir portion and a tube portion having a socket communicating with said reservoir portion, a plug adapted to be removably seated in said socket and having a hollow portion extending upwardly through said reservoir portion, graduations on said hollow portion for indicating the volume of fluid in said reservoir, said plug having an internal passage communicating with said tube portion and having a side aperture connecting said reservoir to said passage, valve means in said plug to open and close said aperture and extending through said hollow portion beyond the upper end of said plug, and a filter secured in the base of said plug between said passage and said tube portion.

References Cited in the file of this patent
UNITED STATES PATENTS

| | | |
|---|---|---|
| 1,035,790 | Heyman | Aug. 13, 1912 |
| 1,339,037 | Munters | May 4, 1920 |
| 2,526,784 | Walker | Oct. 24, 1950 |